(12) United States Patent
Mostafaei et al.

(10) Patent No.: US 12,484,811 B2
(45) Date of Patent: Dec. 2, 2025

(54) HEARING DEVICE, HEARING DEVICE-BASED SYSTEMS AND METHODS FOR MONITORING GLUCOSE

(71) Applicant: SONOVA AG, Staefa (CH)

(72) Inventors: Maryam Mostafaei, Wallisellen (CH); Anne Thielen, Stäfa (CH)

(73) Assignee: Sonova AG, Staefa (CH)

( * ) Notice: Subject to any disclaimer, the term of this patent is extended or adjusted under 35 U.S.C. 154(b) by 649 days.

(21) Appl. No.: 17/943,852

(22) Filed: Sep. 13, 2022

(65) Prior Publication Data

US 2024/0081692 A1    Mar. 14, 2024

(51) Int. Cl.
     *A61B 5/145*      (2006.01)
     *A61B 5/00*      (2006.01)

(52) U.S. Cl.
     CPC ........ *A61B 5/14532* (2013.01); *A61B 5/6898* (2013.01)

(58) Field of Classification Search
     CPC . A61B 5/14532; A61B 5/6898; A61B 5/1455; A61B 5/6817; H04R 1/1008; H04R 25/554; H04R 2201/107; H04R 1/028
     See application file for complete search history.

(56) References Cited

U.S. PATENT DOCUMENTS

| | | |
|---|---|---|
| 2005/0123157 A1 | 6/2005 | Kragelund et al. |
| 2006/0198762 A1* | 9/2006 | Uematsu .......... C12Q 1/54 422/82.11 |
| 2006/0215863 A1 | 9/2006 | Sauer |
| 2008/0117416 A1 | 5/2008 | Hunter et al. |

(Continued)

FOREIGN PATENT DOCUMENTS

| | | |
|---|---|---|
| CN | 112754479 A | 5/2021 |
| CN | 112790762 A | 5/2021 |

(Continued)

OTHER PUBLICATIONS

Feig, et al., "In-depth proteomic analysis of the human cerumen—a potential novel diagnostically relevant biofluid", Journal of proteomics 83 (2013): 119-129. (https://pubmed.ncbi.nlm.nih.gov/23517718/).

(Continued)

*Primary Examiner* — Eric J Messersmith
*Assistant Examiner* — Alyssa Paige Novak
(74) *Attorney, Agent, or Firm* — ALG Intellectual Property, LLC (57) ABSTRACT

An illustrative hearing system may include an optical waveguide at least partially positioned within an ear canal of a user and having a sensing region located between a first end and a second end of the optical waveguide. A light source may be configured to emit light into the optical waveguide at the first end, such that a first portion of the light may exit the optical waveguide at the sensing region and be absorbed by cerumen within the ear canal. A detector may be configured to detect a second portion of the light that exits the optical waveguide at the second end. A processing unit may be configured to determine, based on the second portion of the light detected by the detector and the light emitted by the light source, a glucose value representative of a glucose concentration in the cerumen.

19 Claims, 10 Drawing Sheets

(56) References Cited

U.S. PATENT DOCUMENTS

| | | | |
|---|---|---|---|
| 2013/0131519 A1* | 5/2013 | LeBoeuf | A61B 5/681 |
| | | | 600/476 |
| 2017/0014056 A1* | 1/2017 | Newberry | A61B 5/1455 |
| 2019/0033505 A1* | 1/2019 | Cross | A61B 5/742 |
| 2020/0333363 A1 | 10/2020 | Hierane-Vives et al. | |

FOREIGN PATENT DOCUMENTS

| | | |
|---|---|---|
| SU | 1067459 A1 | 1/1984 |
| WO | 2013166127 A1 | 11/2013 |
| WO | 2021092506 A1 | 5/2021 |

OTHER PUBLICATIONS

Herane-Vives, et al.,"A Novel Earwax Method to Measure Acute and Chronic Glucose Levels", Diagnostics 2020, 10, 1069, DOI: 10.13140/RG.2.2.35622.88642.

Shokry, et al.,"Earwax: A neglected body secretion or a step ahead in clinical diagnosis? A pilot study", Journal of Proteomics, vol. 159, Apr. 21, 2017, pp. 92-101.

Shokry, et al.,"Insights into cerumen and application in diagnostics: past, present and future prospective", Biochem Med (Zagreb) 2017; 27(3):030503.

\* cited by examiner

HEARING DEVICE, HEARING DEVICE-BASED SYSTEMS AND METHODS FOR MONITORING GLUCOSE

BACKGROUND INFORMATION

A hearing device may enable or enhance hearing by a user wearing the hearing device by providing audio content received by the hearing device to the user. For example, a hearing aid may provide an amplified version of the audio content in the form of environmental sound at the location of the user to the user to enhance hearing by the user. A hearing device may further provide audio content to the user based on an audio stream (e.g., an electrical audio signal) received by the hearing device from a streaming source (e.g. a table microphone or a streaming service). As another example, a hearing device may include a cochlear implant system and a sound processor included in the cochlear implant system may provide electrical stimulation representative of the audio content to the user to enable hearing by the user.

In some cases, it may be desirable to monitor a blood sugar or glucose level of a user (e.g., to manage diabetes). In some scenarios, a glucose level may be determined by obtaining a blood sample from the user and measuring the glucose level in the blood sample. Unfortunately, obtaining a blood sample from the user may involve pricking the user (e.g., at a fingertip), which may be painful and/or cause anxiety for the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Because cerumen (e.g., earwax) is a rich biological fluid that includes glucose in a carbohydrate portion of the cerumen, an illustrative hearing system may be configured to measure a glucose content in the cerumen (e.g., as a proxy for blood glucose levels). For example, an illustrative hearing system may be at least partially positioned within an ear canal of a user and configured to illuminate the cerumen with light directly in the ear canal such that a portion of the light may penetrate the cerumen and be absorbed by the glucose in the cerumen. A remaining portion of the light that was not absorbed by the glucose in the cerumen may be detected by a detector of the hearing system to determine a glucose content in the cerumen.

To illustrate, a hearing system may include an optical waveguide configured to be at least partially positioned within an ear canal of a user. The optical waveguide may include a sensing region located between a first end of the optical waveguide and a second end of the optical waveguide. A light source may be configured to emit light into the optical waveguide at the first end, such that a first portion of the light may exit the optical waveguide at the sensing region and be absorbed by cerumen within the ear canal and a second portion of the light may exit the optical waveguide at the second end. A detector may be configured to detect the second portion of the light that exits the optical waveguide at the second end. A processing unit may be configured to determine, based on the second portion of the light detected by the detector and the light emitted by the light source, a glucose value representative of a glucose concentration in the cerumen.

In some implementations, the optical waveguide may be included in a hearing device configured to be at least partially positioned within an ear canal of a user. The hearing device may further include a microphone configured to detect an audio signal presented to the user and an output transducer configured to output the audio signal detected by the microphone to the user.

In some implementations, the optical waveguide may include a core encompassed by a cladding having a lower refractive index than the core such that the optical waveguide may be configured to reflect the light emitted by the light source within the optical waveguide (e.g., to transmit the emitted light through the waveguide). The sensing region of the optical waveguide may be configured to expose the light being transmitted within the optical waveguide to the cerumen and generate an evanescent wave extending into the cerumen.

In some implementations, the determining the glucose value may include determining the first portion of the light absorbed by the cerumen. The glucose value may be representative of the glucose concentration in the cerumen at a point in time and/or a change of the glucose concentration in the cerumen over a period of time. For example, as the first portion of the light absorbed by the cerumen increases, the glucose concentration in the cerumen may be determined to increase. Likewise, as the first portion of the light absorbed by the cerumen decreases, the glucose concentration in the cerumen may be determined to decrease. Additionally or alternatively, the determining the glucose value may include determining the first portion of the light absorbed by the cerumen for light emitted by a plurality of light sources, determining an integrated peak area of the first portion of the light absorbed by the cerumen for the light emitted by the plurality of light sources, and correlating the integrated peak area to the glucose value.

The principles described herein may result in improved hearing systems compared to conventional devices that do not include an optical waveguide for generating an evanescent wave to determine a glucose value, as well as provide other benefits as described herein. For example, a hearing system having optical waveguide for generating an evanescent wave to determine a glucose value may provide a non-invasive approach for monitoring glucose levels. This non-invasive approach may decrease the pain and/or anxiety associated with measuring glucose levels (e.g., from finger-pricking), which may allow a user to perform more regular, quicker, and/or efficient glucose measurements. Moreover, the determination of glucose levels using a wearable device at least partially positioned in the ear canal may further improve long-term monitoring of glucose. For example, the wearable device may be in contact with the cerumen for an extended period of time and may increase the secretion of cerumen. These benefits may provide better management of diabetes and/or save medical costs for the user.

Various embodiments will now be described in more detail with reference to the figures. The systems, hearing devices, and methods described herein may provide one or more of the benefits mentioned above and/or various additional and/or alternative benefits that will be made apparent herein. While monitoring glucose levels in cerumen is described herein, the systems, hearing devices, and methods may additionally or alternatively be configured to monitor other biological compounds in the cerumen (e.g., lipids, proteins, amino acids, carbohydrates, volatile organic compounds, chemical elements, hormones, antibodies, enzymes, etc.).

Figure 1:
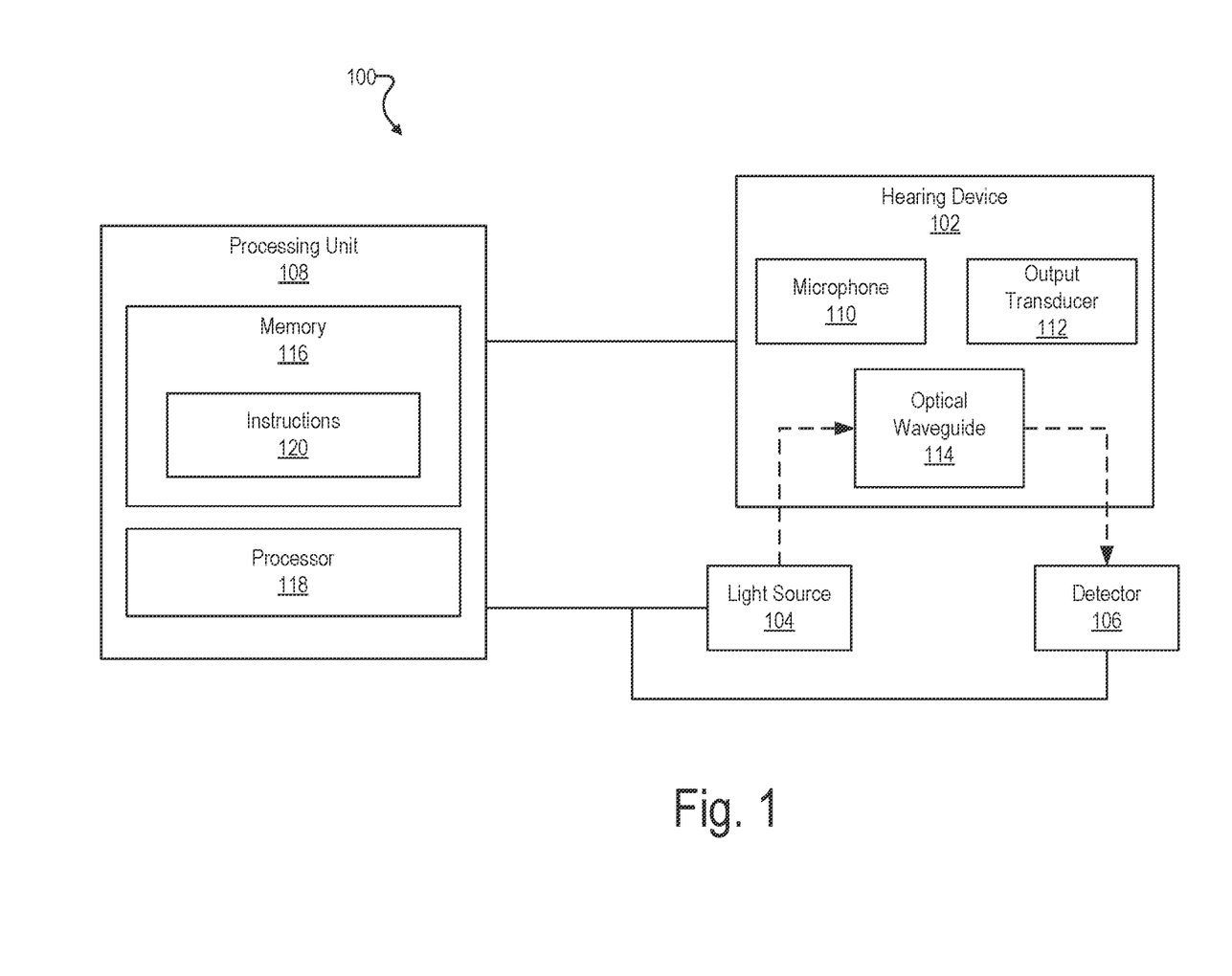
FIG. 1 shows an illustrative implementation of a hearing system.

FIG. 1 shows an illustrative implementation 100 of a hearing system configured to monitor glucose in cerumen. As shown, implementation 100 includes a hearing device 102, at least one light source 104, and at least one detector 106 communicatively coupled with a processing unit 108. Implementation 100 may include additional or alternative components as may serve a particular implementation.

Hearing device 102 herein is to be understood as any device configured to output sound to a user that includes components that are worn at least partially in an ear canal of a user. In particular, hearing device 102 may be implemented as a hearing aid or a hearing instrument configured to enable or enhance hearing by a user wearing hearing device 102. For example, hearing device 102 may be implemented by a hearing aid configured to provide an amplified version of audio content to a user, a sound processor included in a cochlear implant system configured to provide electrical stimulation representative of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis. As described herein, hearing device 102 may include one or more components configured to be at least partially positioned within an ear canal of the user. For example, hearing device 102 may be implemented by earbuds, earphones, hearables, and/or hearing instruments such as a Receiver-In-Canal (RIC) device, an In-The-Ear (ITE) device, a Completely-In-Canal (CIC) device, and/or an Invisible-In-The-Canal (IIC) device.

As shown, hearing device 102 includes a microphone 110, an output transducer 112, and an optical waveguide 114. Hearing device 102 may include additional or alternative components as may serve a particular implementation. Such additional or alternative components may comprise, for example, at least one of a battery, a power management system, a communication interface (e.g., a Bluetooth radio), and/or a user interface (e.g., a push button) to control the hearing device 102.

Microphone 110 may be implemented by one or more suitable audio detection devices configured to detect an audio signal presented to a user of hearing device 102. In particular, microphone 110 may include an electro acoustic transducer configured to convert an audio signal in the form of an acoustic signal, e.g. sound, into an electric audio signal, i.e. an electric signal comprising information representative of the acoustic signal. The audio signal may include, for example, audio content (e.g., music, speech, noise, etc.) generated by one or more audio sources included in an environment of the user. Microphone 110 may be included in or communicatively coupled to hearing device 102 in any suitable manner. In some implementations, an interface may be included in addition to or instead of microphone 110 to receive an audio stream such as an electrical audio signal from a streaming source (e.g., a table microphone and/or a streaming service). Output transducer 112 may be implemented by any suitable audio output device, for instance a loudspeaker, also called 'receiver', of a hearing device or an output electrode of a cochlear implant system.

Optical waveguide 114 may be implemented by any suitable device configured to transmit light through optical waveguide 114. Optical waveguide 114 may include a sensing region located between a first end of optical waveguide 114 and a second end of optical waveguide 114 that may be configured to expose light being transmitted through optical waveguide 114 to cerumen within the ear canal. Accordingly, optical waveguide 114 may be at least partially positioned within an ear canal of a user (e.g., in contact with and/or with uniform pressure against cerumen and/or skin within the ear canal) to allow the sensing region of optical waveguide 114 to expose light being transmitted through optical waveguide 114 to the cerumen. In some implementations, optical waveguide 114 may be included in an ear piece of hearing device 102. While the illustrated implementation shows optical waveguide 114 included in hearing device 102, optical waveguide 114 may additionally or alternatively be provided separately from hearing device 102.

Light source 104 may be implemented by any suitable device (e.g., a light-emitting diode (LED), etc.) configured to emit light. For example, light source 104 may be configured to emit light into optical waveguide 114 at the first end of optical waveguide 114. In some implementations, light source 104 may emit light in a mid-infrared (MIR) range (e.g., light having a wavelength between about 2,500 nanometers and about 10,000 nanometers, such as about 3,000 nanometers to about 8,000 nanometers and/or about 8,000 nanometers to about 10,000 nanometers) and/or other at other suitable wavelengths absorbable by glucose in the cerumen. For example, light source 104 may include a broad band light source (e.g., an infrared transmitter, etc.) and a band pass filter for emitting light in the MIR range. Light source 104 may include one or more light sources. In some implementations, light source 104 may include a plurality of light sources that may be configured to emit light at substantially the same wavelengths and/or different wavelengths.

Detector 106 may be implemented by any suitable device configured to detect light. For example, detector 106 may be configured to detect light that exits optical waveguide 114 at the second end of optical waveguide 114. In some implementations, detector 106 may detect light in the mid-infrared range (e.g., light having a wavelength between about 2,500 nanometers and about 10,000 nanometers, such as about 3,000 nanometers to about 8,000 nanometers and/or about 8,000 nanometers to about 10,000 nanometers). To illustrate, detector 106 may include a photodetector, a mercury cadmium telluride (MCT) detector, and/or other infrared receiver. In some implementations, detector 106 may include a single detector. Additionally or alternatively, detector 106 may include a plurality of detectors that may be configured to detect light at substantially the same wavelengths and/or different wavelengths.

Processing unit 108 may be implemented by one or more computing devices and/or computer resources (e.g., processors, memory devices, storage devices, etc.) as may serve a particular implementation. For example, processing unit 108 may be implemented by a mobile device, personal computer, and/or other computing device configured to be communicatively coupled (e.g., by way of a wired and/or wireless connection) to hearing device 102, light source 104, and/or detector 106. As shown, processing unit 108 may include, without limitation, a memory 116 and a processor 118 selectively and communicatively coupled to one another. Memory 116 and processor 118 may each include or be implemented by computer hardware that is configured to store and/or process computer software. Various other components of computer hardware and/or software not explicitly shown in FIG. 1 may also be included within processing unit 108. In some examples, memory 116 and/or processor 118 may be distributed between multiple devices and/or multiple locations as may serve a particular implementation.

Memory 116 may store and/or otherwise maintain executable data used by processor 118 to perform any of the functionality described herein. For example, memory 116 may store instructions 120 that may be executed by processor 118. Memory 116 may be implemented by one or more memory or storage devices, including any memory or storage devices described herein, that are configured to store data in a transitory or non-transitory manner. Instructions 120 may be executed by processor 118 to cause processing unit 108 to perform any of the functionality described herein. Instructions 120 may be implemented by any suitable application, software, code, and/or other executable data instance. Additionally, memory 116 may also maintain any other data accessed, managed, used, and/or transmitted by processor 118 in a particular implementation.

Processor 118 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), image signal processors, or the like. Using processor 118 (e.g., when processor 118 is directed to perform operations represented by instructions 120 stored in memory 116), processor 118 may perform various operations as described herein.

Figure 2:
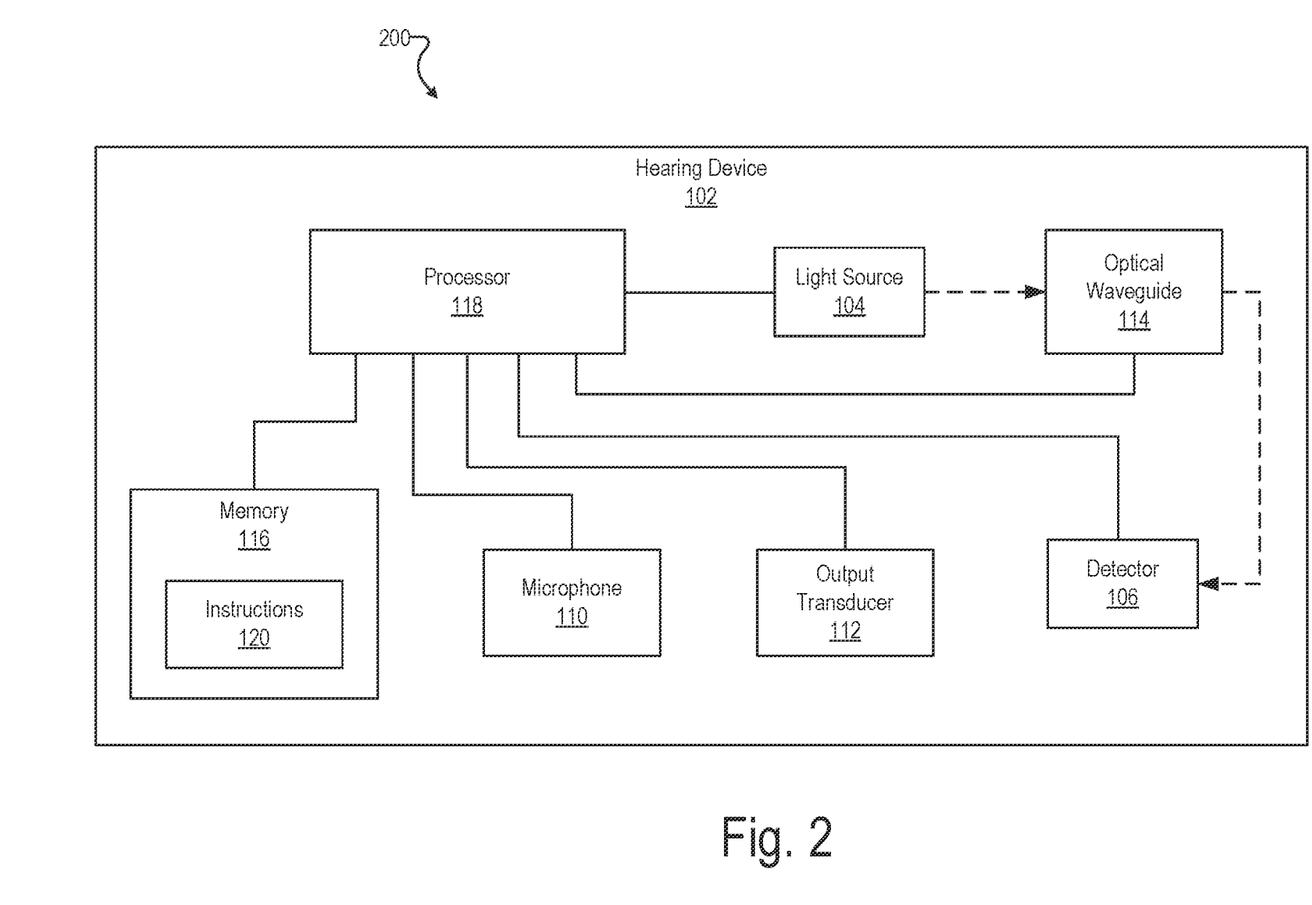
FIG. 2 shows another illustrative implementation of a hearing system.

FIG. 2 shows another illustrative implementation 200 of a hearing system configured to monitor glucose in cerumen. As shown, implementation 200 is similar to implementation 100, except that implementation 200 includes light source 104, detector 106, memory 116, and processor 118 located within hearing device 102. Implementation 200 may include additional or alternative components as may serve a particular implementation.

Figure 3:
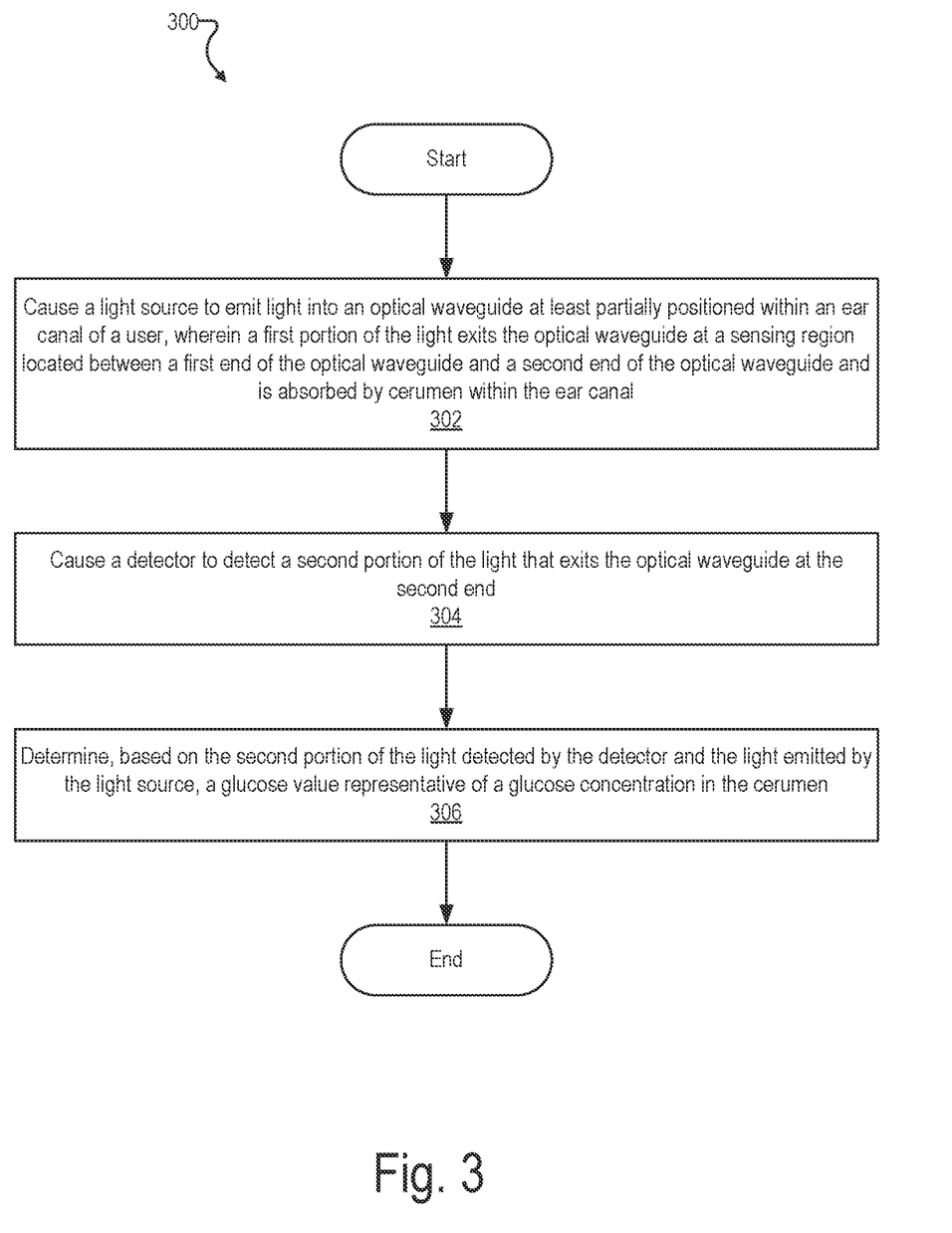
FIG. 3 shows an illustrative method of operating a hearing system.

FIG. 3 shows an illustrative method 300 that may be performed by a hearing system according to the principles described herein. While FIG. 3 illustrates exemplary operations according to one embodiment, other embodiments may omit, add to, reorder, and/or modify any of the operations shown in FIG. 3. Moreover, each of the operations depicted in FIG. 3 may be performed in any of the ways described herein. In some implementations, each of the operations depicted in FIG. 3 may be performed by at least one computing device (e.g., by processor 118).

As shown, hearing system may, at operation 302, cause light source 104 to emit light into optical waveguide 114 at least partially positioned within an ear canal of a user, wherein a first portion of the light exits optical waveguide 114 at a sensing region located between a first end of optical waveguide 114 and a second end of optical waveguide 114 and is absorbed by cerumen within the ear canal. Hearing system may, at operation 304, further cause detector 106 to detect a second portion of the light that exits optical waveguide 114 at the second end. Hearing system may, at operation 306, further determine, based on the second portion of the light detected by detector 106 and the light emitted by light source 104, a glucose value representative of a glucose concentration in the cerumen.

Figure 4:
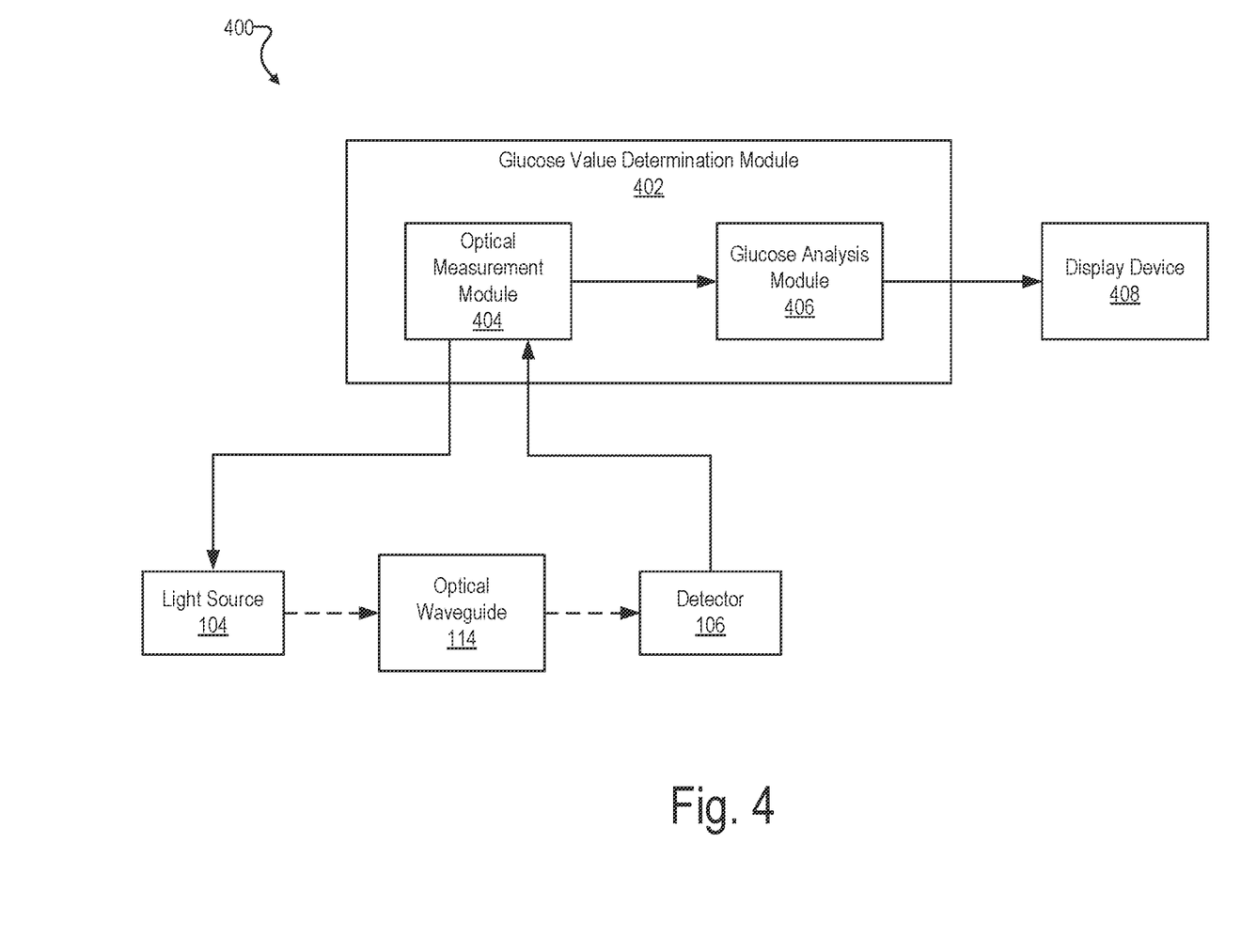
FIG. 4 shows an illustrative implementation of a hearing system.

As an illustrative example, FIG. 4 shows an implementation 400 including a glucose value determination module 402 that may be implemented by a hearing system (e.g., by processor 118) according to the principles described herein and configured to determine a glucose value. As shown, glucose value determination module 402 may include an optical measurement module 404 and a glucose analysis module 406. Glucose value determination module 402 may include additional or alternative components as may serve a particular implementation.

Optical measurement module 404 may be communicatively coupled (e.g., by way of a wired and/or wireless connection) to light source 104 and detector 106. Optical measurement module 404 may be configured to cause light source 104 to emit light into the first end of optical waveguide 114. In some implementations, optical measurement module 404 may cause light source 104 to emit light at a select wavelength and/or intensity. Optical measurement module 404 may further cause light source 104 to emit light at select intervals (e.g., about every 24 hours, about every 12 hours, about every 8 hours, etc.) and/or based on a user input received from a user interface. For example, optical measurement module 404 may be communicatively coupled (e.g., by way of a wired and/or wireless connection) with a user interface included in hearing device 102 and/or different wearable device separate from hearing device 102 (e.g., a watch or a mobile device worn or carried by the user) to receive a user input from the user interface.

Optical measurement module 404 may further be configured to cause detector 106 to detect light that exits optical waveguide 114 at the second end (e.g., during a time period corresponding to the emitting of light by light source 104, such as up to about 30 seconds, up to about 10 seconds, and/or up to about 2 seconds). Additionally, optical measurement module 404 may be configured to receive detector data representative of light detected by detector 106 and outputted by detector 106. Optical measurement module 404 may be configured to process the detector data to determine a wavelength and/or an intensity of the light detected by detector 106.

Glucose analysis module 406 may be configured to receive, from optical measurement module 404, analysis data representative of the wavelength and/or intensity of the second portion of light detected by detector 106 and the wavelength and/or intensity of the light emitted by light source 104. Glucose analysis module 406 may further be configured to determine the glucose value based on the received analysis data (e.g., by comparing the second portion of light detected by detector 106 to the light emitted by light source 104). The glucose value may be represented by any suitable metric, such as a discrete value (e.g., a concentration, a level, a range, a percentage, etc.) representative of a glucose concentration in the cerumen. The glucose value may be representative of the glucose concentration in the cerumen at a point in time and/or representative of a change of the glucose concentration in the cerumen over a period of time. In some implementations, glucose analysis module 406 may further be configured to output the glucose value to a display device 408 (e.g., a watch, mobile device, etc.) to display the glucose value to the user.

Figure 5A:
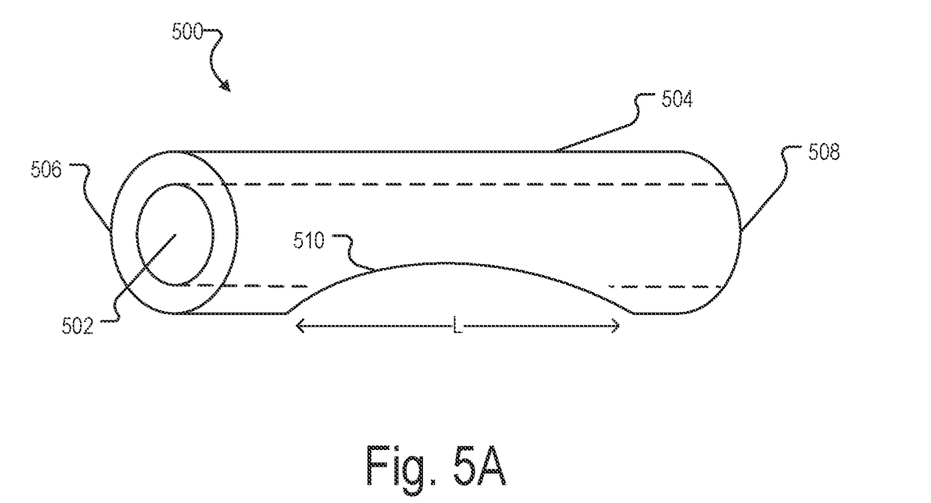
FIG. 5A shows an illustrative implementation of an optical waveguide included in a hearing device.

FIG. 5A shows an illustrative implementation 500 of an optical waveguide that may implement or be similar to optical waveguide 114. As shown, optical waveguide 500 includes a core 502 encompassed by a cladding 504 that each extend from a first end 506 to a second end 508 of optical waveguide 500. Cladding 504 may be formed from a material (e.g., glass, crystal, plastic, resin, etc.) having a lower refractive index than a material forming core 502 (e.g., glass, crystal, plastic, resin, etc.) such that optical waveguide 500 may be configured to reflect the light emitted by light source 104 within optical waveguide 500. In some implementations, core 502 may be formed by air such that cladding 504 may form an opening extending therethrough. Core 502 may be configured to receive light emitted by light source 104 and cladding 504 may be configured to reflect the received light within core 502 (e.g., by total internal reflection).

Optical waveguide 500 further includes a sensing region 510 located between first end 506 and a second end 508 of optical waveguide 500. Sensing region 510 may be configured to expose light being transmitted within optical waveguide 500 to cerumen within the ear canal. For example, sensing region 510 may include an opening extending through cladding 504 to core 502 along a length L of optical waveguide 500. Additionally or alternatively, sensing region 510 may be formed from a material (e.g., glass, plastic, resin, etc.) having a higher refractive index than cladding 504 that may allow light to pass through sensing region 510. In some implementations, sensing region 510 may be coated with glucose imprinted polymers. Moreover, graphene quantum dots may be incorporated into the glucose imprinted polymers, which may enhance the sensitivity of sensing region 510. While the illustrated implementation shows optical waveguide 500 having one sensing region 510, optical waveguide 500 may include any number of additional sensing regions 510 positioned at any suitable portion of optical waveguide 500.

In the illustrated implementation, optical waveguide 500 includes a substantially linear cylindrical configuration, though optical waveguide 500 may include any other suitable configuration (e.g., curved, etc.). Optical waveguide 500 may be rigid and/or flexible.

Figure 5B:
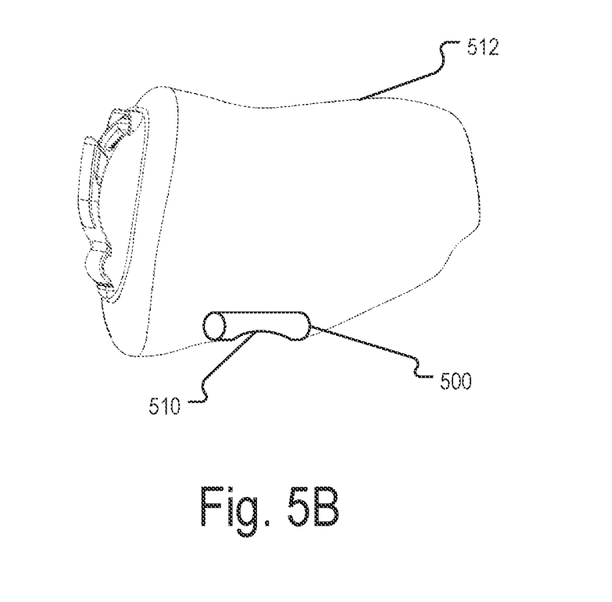
FIG. 5B shows a perspective view of the optical waveguide of FIG. 5A.

In some implementations, as shown in FIG. 5B, optical waveguide 500 may be included in a hearing device 512. Hearing device 512 may implement or be similar to hearing device 102. As shown, optical waveguide 500 may be included in hearing device 512 such that sensing region 510 of optical waveguide 500 is positioned along an exterior surface of hearing device 512. This may allow sensing region 510 to be sufficiently positioned relative to cerumen within the ear canal to allow a portion of the light being transmitted within optical waveguide 500 to be exposed to and absorbed by glucose in the cerumen. While the illustrated implementation shows optical waveguide 500 positioned at a bottom portion of hearing device 512, optical waveguide 500 may be positioned at any other suitable portion of hearing device 512 (e.g., a top portion, a side portion, etc.).

Figure 6A:
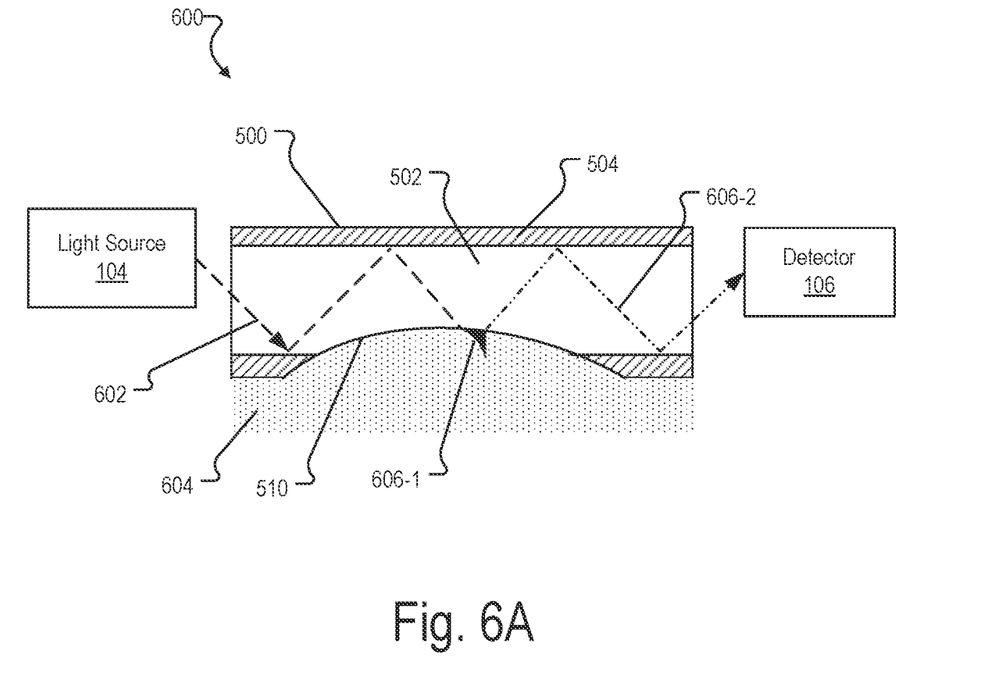
FIG. 6A shows an illustrative implementation of operating an optical waveguide of a hearing system.

As an illustrative example, FIG. 6A shows an implementation 600 of light being transmitted within optical waveguide 500. As shown, light source 104 is configured to emit light 602 within core 502 of optical waveguide 500 (e.g., at an angle toward cladding 504). Because cladding 504 has a lower refractive index than core 502, cladding 504 may reflect the emitted light 602 back within core 502 to transmit the emitted light 602 through optical waveguide 500.

When the emitted light 602 reaches sensing region 510 of optical waveguide 500, the emitted light 602 may be exposed to cerumen 604 in contact with sensing region 510. Accordingly, a first portion 606-1 of the emitted light 602 may form an evanescent wave within cerumen 604 and be absorbed by glucose within cerumen 604 (e.g., an evanescent wave may be formed with light traveling through core 502 undergoes total internal reflection and strikes cerumen 604 at an angle greater than a critical angle). For example, if any absorbing glucose particles exist in and/or near the evanescent wave, the glucose particles may absorb the evanescent wave, which may result in attenuation of light 602 being propagated by core 502. In some scenarios, the first portion 606-1 of light may penetrate cerumen 604 at a depth of about 200 nanometers to about 1 micrometer, such that a small sample of cerumen 604 may be used (e.g., more than about 1 micrometer thickness).

A second portion 606-2 of the emitted light 602 (e.g., the remaining portion of the emitted light 602 that was not absorbed by cerumen 604) may continue to be reflected within core 502 and exit optical waveguide 500. Detector 106 may thereby detect the second portion 606-2 of the emitted light 602.

In some implementations, the determining the glucose value may include determining the first portion 606-1 of the light absorbed by cerumen 604. For example, the first portion 606-1 of light absorbed by cerumen 604 may be determined based on an intensity of the second portion 606-2 of light detected by detector 106 and an intensity of light 602 emitted by light source 104 (e.g., an absorption A of the first portion 606-1 of light may be equivalent to $-\log(I_o/I_i)$, where $I_o$ is the intensity of the second portion 606-2 of light detected by detector 106 and $I_i$ is the intensity of light 602 emitted by light source 104). Because of the first portion 606-1 of light absorbed by cerumen 604, the emitted light 602 may be attenuated such that the second portion 606-2 of light detected by detector 106 may have a lower intensity than light 602 emitted by light source 104.

In some implementations, the determining the glucose value may include determining an actual concentration of glucose in cerumen 604 (e.g., at a point in time). For example, the glucose concentration may be determined based on the absorption A of the first portion 606-1 of light, such as by using Beer's Law:

$$A = 4\frac{\sqrt{2}}{3}\frac{\lambda}{2\pi r\sqrt{n_{core}^2 - n_{cladd}^2}}\frac{\alpha CL}{2.303}$$

where C may be the concentration of glucose, λ may be the wavelength of emitted light 602, α may be a molar extinction coefficient of glucose, r may be a radius of core 502 (e.g., about 100 micrometers), L may the length of sensing region 510 (e.g., from about 5 millimeters to about 20 millimeters), and $n_{core}$ and $n_{cladd}$ may be a refractive index of core 502 and cladding 504, respectively.

Additionally or alternatively, the determining the glucose value may include determining a relative change in the concentration of glucose in cerumen 604 (e.g., over a period of time). For example, the concentration of glucose in a fresh sample of cerumen 604 may be compared with respect to the concentration of glucose in a previous sample of cerumen 604. Because the concentration of glucose in cerumen 604 is directly proportional to absorption A of the first portion 606-1 of the light, the concentration of glucose in cerumen 604 may increase as absorption A of the first portion 606-1 of the light increases and/or the concentration of glucose in cerumen 604 may decrease as absorption A of the first portion 606-1 of the light decreases.

Figure 6B:
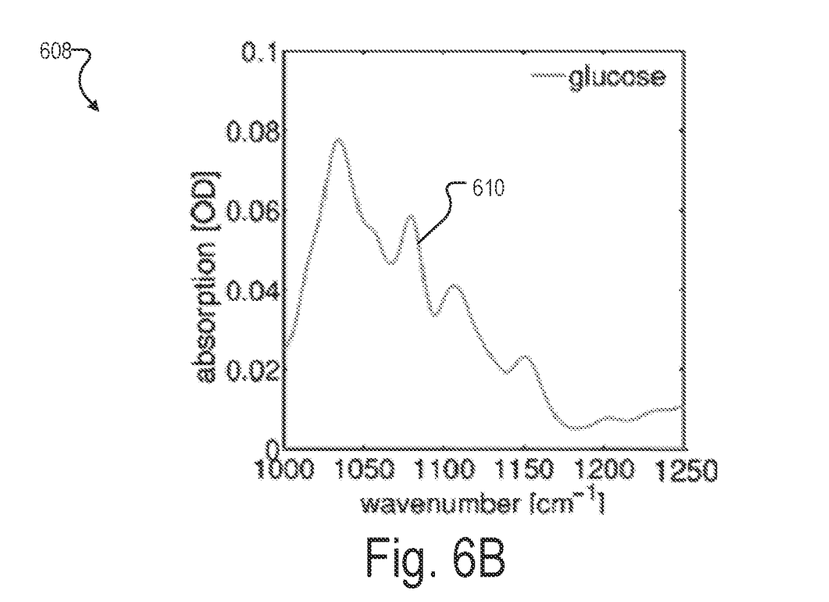
FIG. 6B shows an illustrative implementation of an absorption spectrum of glucose in a mid-infrared region.

In some implementations, the determining the glucose value may include comparing the absorption A of the first portion 606-1 of light with reference data representative of predetermined glucose values for the absorption A of the first portion 606-1 of light. For example, FIG. 6B shows an illustrative implementation 608 of glucose values 610 associated with an absorption A of the first portion 606-1 of light. Accordingly, the absorption A of the first portion 606-1 of light may be compared to the reference data to determine a glucose value representative of the glucose concentration in cerumen 604 based on the wavelength and/or wavenumber of the emitted light 602. Such reference data may be based on previous levels of absorption A by the user and/or other users. In some examples, the reference data may be stored in memory 116.

In some implementations, the hearing system may be calibrated for a user of the hearing system. For example, water content in cerumen 604 of the user may affect the determination of the glucose value. To illustrate, the hearing system may be calibrated by determining a baseline glucose value for the user. In some implementations, the baseline glucose value may be associated with an event (e.g., the morning, the evening, after eating, after taking medication, etc.). Glucose values determined after the baseline glucose value may be compared to the baseline glucose value for each respective event, such that a relative change in the glucose value from the baseline glucose value may be determined. In some implementations, optical waveguide 500 and/or hearing device 512 may be removed and cleaned after each glucose reading.

Figure 7A:
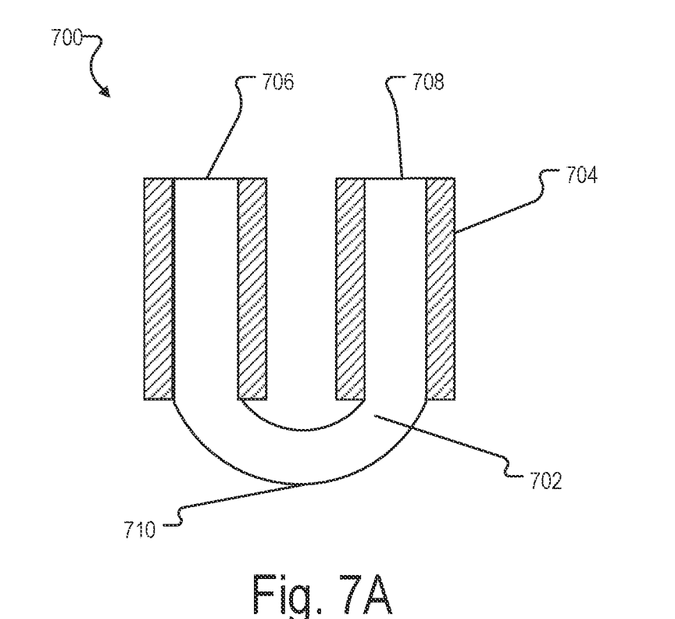
FIG. 7A shows an illustrative implementation of an optical waveguide that may be implemented in a hearing system.

FIG. 7A shows another illustrative implementation of an optical waveguide 700 that may implement or be similar to optical waveguide 500. As shown, optical waveguide 700 includes a core 702 encompassed by a cladding 704 at a portion of first end 706 and a portion of second end 708 of optical waveguide 700 such that cladding 704. Optical waveguide 700 further includes a sensing region 710 located between first end 706 and a second end 708 of optical waveguide 700. In the illustrated implementation, sensing region 710 is not encompassed by cladding 704 such that sensing region 710 is entirely exposed. Moreover, sensing region 710 of the illustrated implementation is curved such that optical waveguide 700 forms a U-shaped configuration. Still other suitable configurations for optical waveguide 700 may be used.

Figure 7B:
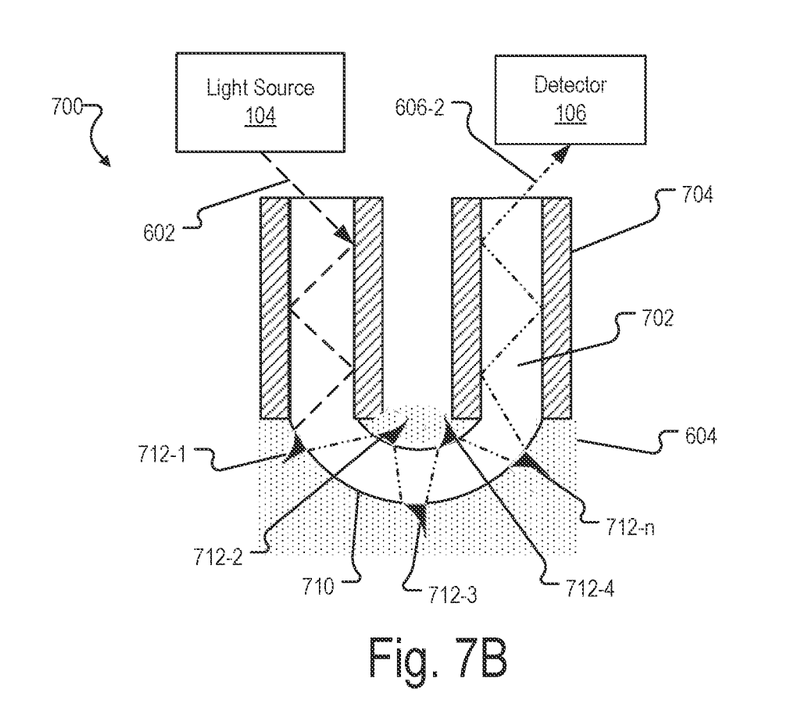
FIG. 7B shows an illustrative implementation of operating the optical waveguide of FIG. 7A.

As shown in FIG. 7B, light source 104 may be configured to emit light 602 within core 702 of optical waveguide 700 toward cladding 704. Because cladding 704 has a lower refractive index than core 702, cladding 704 may reflect the emitted light 602 back within core 702 to transmit the emitted light 602 through optical waveguide 700. When the emitted light 602 reaches sensing region 710 of optical waveguide 700, the emitted light 602 may be exposed to cerumen 604 in contact with sensing region 710. In the illustrated implementation, some of the emitted light 602 may form an evanescent wave and be absorbed by glucose in cerumen 604 at a plurality of first portions 712 (e.g., first portions 712-1 to 712-n). The second portion 606-2 of light (e.g., the remaining portion of the emitted light 602 that was not absorbed by cerumen 604) may continue to be reflected within core 702 and exit optical waveguide 700. Detector 106 may thereby detect the second portion 606-2 of light for determining the glucose value.

Figure 8:
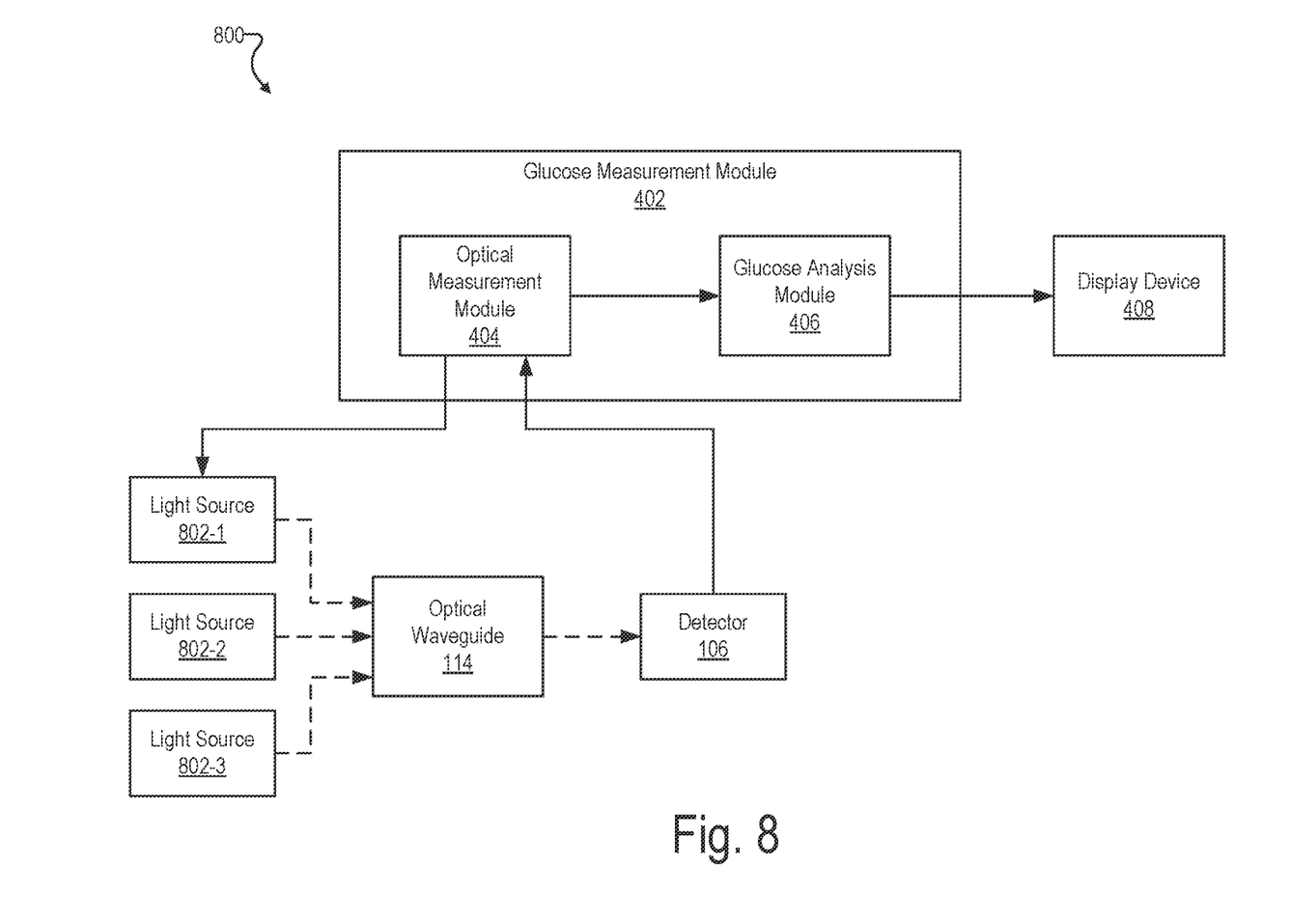
FIG. 8 shows an illustrative implementation of a hearing system.

FIG. 8 shows another implementation 800 of a hearing system that may implement or be similar to implementation 400, except that implementation 800 includes a plurality of light sources 802 (e.g., light sources 802-1 to 802-3). Light sources 802 may be configured to emit light into optical waveguide 114 at a plurality of different wavelengths and/or intensities. Implementation 800 may include additional or alternative components as may serve a particular implementation.

In instances where the hearing system includes a plurality of light sources 802, the determining the glucose value may include determining the first portion of light absorbed by glucose of cerumen 604 for the light emitted by each light source of the plurality of light sources 802. In some implementations, the light emitted by the plurality of light sources 802 may be performed sequentially. For example, a first light source 802-1 may emit light into optical waveguide 114 that may be detected by detector 106, then a second light source 802-2 may emit light into optical waveguide 114 that may be detected by detector 106, and so on. The determining the glucose value may further include determining an integrated peak area of the first portion of light absorbed by glucose of cerumen 604 for the light emitted by each light source of the plurality of light sources 802.

Figure 9:
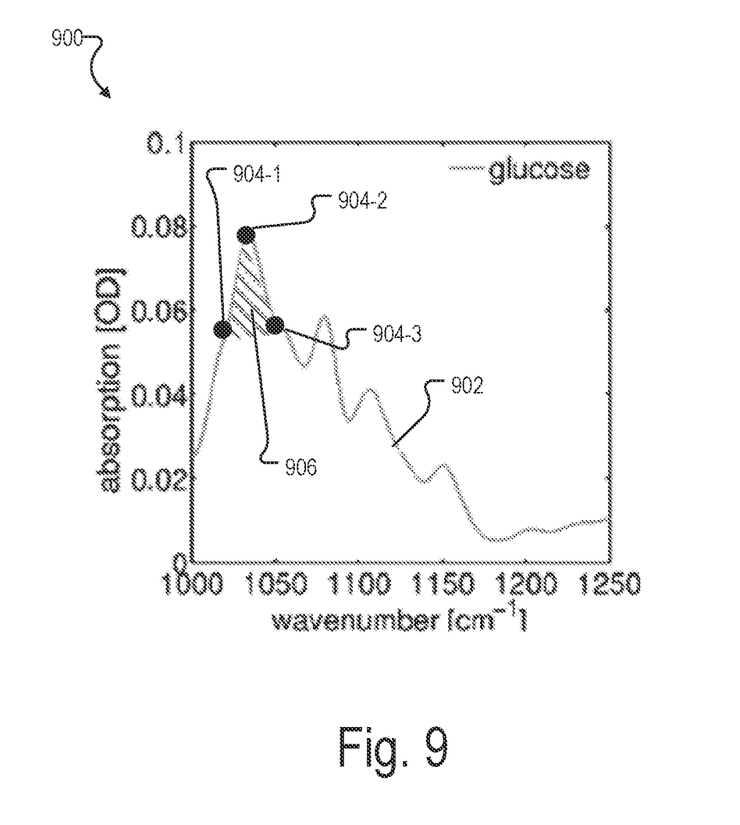
FIG. 9 shows an illustrative implementation of an absorption spectrum of glucose in a mid-infrared region.

As an illustrative example, FIG. 9 shows an implementation 900 of glucose 902 associated with an absorption A of the first portion of light. Accordingly, a first glucose value 904-1 may be associated with the light absorbed from first light source 802-1, a second glucose value 904-2 may be associated with the light absorbed from second light source 802-2, and a third glucose value 904-3 may be associated with the light absorbed from third light source 802-3. An integrated peak area 906 may be determined based on these glucose values 904 (e.g., an area formed by glucose values 904-1 to 904-3).

In some implementations, the integrated peak area 906 may be correlated to a comprehensive glucose value. For example, integrated peak area 906 may be compared to reference data representative of predetermined comprehensive glucose values for integrated peak areas to determine a comprehensive glucose value representative of the glucose concentration in cerumen 604. Such reference data may be based on previous levels of absorption A by the user and/or other users. In some examples, the reference data may be stored in memory 116. Moreover, for a relative glucose value, the integrated peak area 906 may be considered as a proxy for changes in the glucose concentration of cerumen 604 (e.g., due to a linear correlation between integrated peak area 906 and the glucose concentration).

While the illustrated implementation shows the hearing system including three light sources 802, the hearing system may include any suitable number of more and/or less light sources that may be used to determine integrated peak area 906. For example, in some instances, one or more light sources 802 may be configured to emit light at more than one wavelength and/or intensity. Additionally or alternatively, other suitable methods for determining a comprehensive glucose value may be used. For example, the comprehensive glucose value may be determined using a characteristic (e.g., a mean, a median, an average, etc.) of the light absorbed at the plurality of wavelengths.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
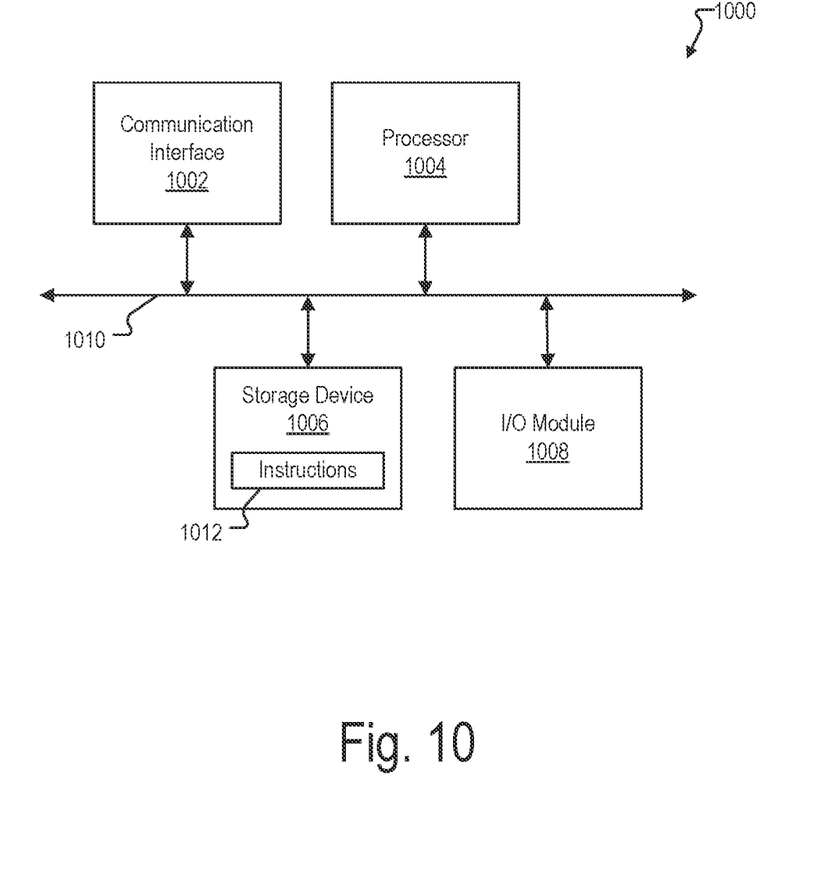
FIG. 10 shows an illustrative computing system according to the principles described herein.

FIG. 10 shows an illustrative computing device 1000 that may be specifically configured to perform one or more of the processes described herein. Any of the systems, computing devices, and/or other components described herein may be implemented by computing device 1000.

As shown in FIG. 10, computing device 1000 may include a communication interface 1002, a processor 1004, a storage device 1006, and an input/output ("I/O") module 1008 communicatively connected one to another via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing system comprising:
   an optical waveguide including a sensing region located between a first end of the optical waveguide and a second end of the optical waveguide, the sensing region being configured to be at least partially positioned within an ear canal of a user so as to be in contact with cerumen located in the ear canal;
   a light source configured to emit light into the optical waveguide at the first end, wherein a first portion of the light exits the optical waveguide at the sensing region and is absorbed by cerumen within the ear canal and a second portion of the light exits the optical waveguide at the second end;
   a detector configured to detect the second portion of the light that exits the optical waveguide at the second end; and
   a processor configured to determine, based on the second portion of the light detected by the detector and the light emitted by the light source, a glucose value representative of a glucose concentration in the cerumen;

wherein the optical waveguide is included in an ear piece of a hearing device, the ear piece being configured to be at least partially positioned within the ear canal of the user, wherein the sensing region of the optical waveguide is positioned on a lateral exterior surface of the ear piece.

2. The hearing system of claim 1, wherein the hearing device comprises:
  a microphone configured to detect an audio signal presented to the user; and
  an output transducer configured to output the audio signal detected by the microphone to the user.

3. The hearing system of claim 1, wherein the optical waveguide comprises a core encompassed by a cladding having a lower refractive index than the core such that the optical waveguide is configured to reflect the light emitted by the light source within the optical waveguide.

4. The hearing system of claim 3, wherein the sensing region is formed by an opening extending through the cladding to the core that is configured to expose the light being transmitted within the optical waveguide to the cerumen and generate an evanescent wave extending into the cerumen.

5. The hearing system of claim 1, wherein the light emitted by the light source has a wavelength between about 2,500 nanometers and about 10,000 nanometers.

6. The hearing system of claim 5, wherein the wavelength is between about 8,000 nanometers and about 10,000 nanometers.

7. The hearing system of claim 1, wherein the determining the glucose value includes determining the first portion of the light absorbed by the cerumen.

8. The hearing system of claim 1, wherein the glucose value is representative of the glucose concentration in the cerumen at a point in time.

9. The hearing system of claim 1, wherein the glucose value is representative of a change of the glucose concentration in the cerumen over a period of time.

10. The hearing system of claim 1, wherein the light source includes a plurality of light sources configured to emit light into the optical waveguide at a plurality of wavelengths.

11. The hearing system of claim 10, wherein the determining the glucose value includes:
  determining the first portion of the light absorbed by the cerumen for the light emitted by each light source of the plurality of light sources;
  determining an integrated peak area of the first portion of the light absorbed by the cerumen for the light emitted by each light source of the plurality of light sources; and
  correlating the integrated peak area to the glucose value.

12. The hearing system of claim 1, wherein the sensing region is coated with glucose imprinted polymers.

13. A method comprising:
  causing, by at least one computing device, a light source to emit light into an optical waveguide at least partially positioned within an ear canal of a user, wherein the optical waveguide is included in an ear piece of a hearing device such that a sensing region of the optical waveguide is positioned on a lateral exterior surface of the ear piece, wherein a first portion of the light exits the optical waveguide at a sensing region located between a first end of the optical waveguide and a second end of the optical waveguide and is absorbed by cerumen within the ear canal;
  causing, by the at least one computing device, a detector to detect a second portion of the light that exits the optical waveguide at the second end; and
  determining, by the at least one computing device and based on the second portion of the light detected by the detector and the light emitted by the light source, a glucose value representative of a glucose concentration in the cerumen.

14. The method of claim 13, wherein the causing the light source to emit light into the optical waveguide includes generating an evanescent wave by reflecting the light emitted by the light source within the optical waveguide.

15. The method of claim 13, wherein the determining the glucose value includes determining the first portion of the light absorbed by the cerumen.

16. The method of claim 13, wherein the glucose value is representative of the glucose concentration in the cerumen at a point in time.

17. The method of claim 13, wherein the glucose value is representative of a change of the glucose concentration in the cerumen over a period of time.

18. The method of claim 13, wherein:
  the causing the light source to emit light into the optical waveguide includes causing a plurality of light sources to emit light into the optical waveguide at a plurality of wavelengths; and
  the determining the glucose value includes:
    determining the first portion of the light absorbed by the cerumen for the light emitted by each light source of the plurality of light sources;
    determining an integrated peak area of the first portion of the light absorbed by the cerumen for the light emitted by each light source of the plurality of light sources; and
    correlating the integrated peak area to the glucose value.

19. A hearing device having an ear piece, the ear piece being configured to be positioned within an ear canal of a user, the hearing device comprising:
  a microphone configured to detect an audio signal presented to the user;
  an output transducer configured to output the audio signal detected by the microphone to the user;
  an optical waveguide including a sensing region located between a first end of the optical waveguide and a second end of the optical waveguide, the sensing region positioned on a lateral exterior surface of the ear piece and configured to be in contact with cerumen within the ear canal when the ear piece is positioned within the ear canal;
  a light source configured to emit light into the optical waveguide at the first end, wherein a first portion of the light exits the optical waveguide at the sensing region and is absorbed by cerumen within the ear canal and a second portion of the light exits the optical waveguide at the second end; and
  a detector configured to detect the second portion of the light that exits the optical waveguide at the second end for determining, based on the second portion of the light detected by the detector and the light emitted by the light source, a glucose value representative of a glucose concentration in the cerumen.

* * * * *